Patented July 23, 1935

2,009,086

UNITED STATES PATENT OFFICE 2,009,086

DEVITALIZATION OF BACTERIA

William S. Jones, Brooklyn, N. Y., assignor to E. R. Squibb & Sons, New York, N. Y., a corporation of New York No Drawing. Application May 13, 1933, Serial No. 671,007

13 Claims. (Cl. 167—65)

This invention relates to, and has for its object the provision of, certain new compounds, processes of preparing them, and methods for devitalizing—that is, destroying, inhibiting the growth of, or rendering harmless—bacteria, particularly such as cause infections of the urogenital tract.

The compounds of this invention comprise the group having the general formula

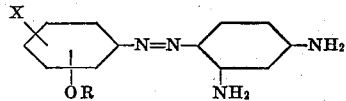

wherein X represents a halogen and R represents an alkyl or hydrogen, especially

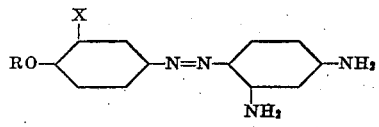

and

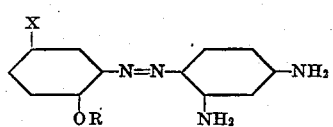

These compounds may be prepared by diazotizing

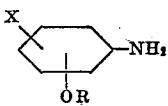

and coupling the reaction product with m-phenylene diamine.

By subjecting them to the action of these compounds, bacteria may be efficiently devitalized. These compounds are highly active, even in considerable dilution; they are only negligibly toxic to animals; when introduced, by oral administration, into the human system, they are selectively adsorbed by the tissues and organs of the urogenital tract, and exercise a bacteriostatic effect largely while conveyed by the urine, in which they are excreted; and they are indicated in such types of infection as pyelitis and cystitis, and have many other possible applications. For internal use, they are ordinarily to be taken in a daily dose (for adults) of three 0.1 g. tablets, preferably when the urine is acid in reaction.

Example 1

To prepare 3-chloro 4-ethoxy 2',4'-diamino azo benzene hydrochloride, phenacetin may be treated with chlorine in the presence of acetic acid and sodium acetate; the chlorophenacetin is then hydrolyzed with 18% hydrochloric acid; 28.0 g. of 3-chloro 4-ethoxy aniline hydrochloride is suspended in a mixture of 19 cc. of concentrated hydrochloric acid and 125 cc. of water and, while kept at 0° C., is diazotized with 9.0 g. of sodium nitrite dissolved in 40 cc. of water; the same temperature being maintained, a solution of 19.5 g. of m-phenylene diamine hydrochloride is stirred in, and agitation is continued for two hours; the reaction mixture is allowed to stand for fifteen hours at 20° C. and is then made ammoniacal; 3-chloro 4-ethoxy 2', 4'-diamino azo benzene separates out, is filtered off, washed with water, and dried in vacuo; giving a red powder; and suspending this base in hot alcohol, adding the theoretical quantity of hydrochloric acid, and evaporating, yields 3-chloro 4-ethoxy 2',4'-diamino azo benzene hydrochloride, a greenish-black compound.

Example 2

To prepare 3-chloro 4-butoxy 2',4'-diamino azo benzene hydrochloride, 18.0 g. of p-hydroxy acetanilide is dissolved in 50 cc. of hot alcohol; a 60 cc. alcoholic solution of 2.91 g. of sodium as sodium ethoxide is added, and then 18.0 g. of butyl bromide; the mixture is refluxed on the steam-bath for six hours, the sodium bromide meantime separated out is filtered off; the filtrate is diluted with 50 cc. of water, p-butoxy acetanilide crystallizes out and is filtered off, washed with cold 60% alcohol, and dried in vacuo; small needle-like white crystals, melting at 112° C., are obtained. In 75 cc. of glacial acetic acid, 19.0 g. of p-butoxy acetanilide is dissolved, 10.0 g. of fused sodium acetate is added; the suspension is cooled to 20° C. and held thereat while 14.0 g. of sulfuryl chloride in 20 cc. of glacial acetic acid is added, agitation being maintained during and for forty minutes after this addition; the suspension is poured into 400 cc. of cold water, the precipitate is filtered off, washed with cold water, and sucked dry on filter paper; the 3-chloro 4-butoxy acetanilide is crystallized from 60% alcohol, filtered off, washed with dilute alcohol, and dried in vacuo; large, plate-like white crystals, melting at 73° C., are obtained. In 70 cc. of 18% hydrochloric acid, 11.5 g. of 3-chloro 4-butoxy acetanilide is suspended and hydrolyzed by boiling for one-half hour; the solution is cooled, and the hydrochloride of 3-chloro 4-butoxy aniline crystallizes out, is filtered off, washed with cold 18% hydrochloric acid, and dried in vacuo; long needle-like white crystals are obtained. In 100 cc. of water and 8 cc. of concentrated hydrochloric acid, 6.2 g. of 3-chloro 4-butoxy aniline hydrochloride is dissolved; diazotization is effected with 2.5 g. of sodium nitrite in 20 cc. of water at 0° C.; excess nitrous acid is destroyed by means of 1 g. of urea; a solution of 3.8 g. of m-phenylene diamine hydrochloride in 30 cc. of water is added at 0° C.; the solution is stirred for one hour at 0° C., allowed to stand at 25° C. for fifteen hours, and made ammoniacal with 35 cc. of concentrated ammonium hydroxide; the dark red precipitate, the base of the desired compound, is filtered off, washed with 2 liters of water, and dried in vacuo; conversion into the hydrochloride is effected by dissolving 7.3 g. of the base in 150 cc. of acetone and 3.5 cc. of concentrated hydrochloric acid, evaporating to dryness, and drying in vacuo over calcium chloride and potassium hydroxide; the desired compound is obtained in the form of large plate-like greenish-black crystals melting at 176–178° C. and decomposing at 185–186° C.

Example 3

To prepare 3-bromo 4-ethoxy 2′,4′-diamino azo benzene hydrochloride, 12.62 g. of 3-bromo 4-ethoxy aniline hydrochloride is dissolved in 120 cc. of water and 10 cc. of concentrated hydrochloric acid; the solution is cooled to between 0° and —5° C., and diazotization is effected at this temperature with 4.0 g. of sodium nitrite; excess nitrous acid is destroyed by means of 1 g. of urea; 7.23 g. of m-phenylene diamine hydrochloride in 50 cc. of water is added at 0° C.; the solution is stirred for one hour at 0° C., allowed to stand at 25° C. for fifteen hours, and made ammoniacal; the precipitate is filtered off, washed with 2 liters of water, and dried in vacuo; the orange-red residue is dissolved in 200 cc. of acetone containing 6 cc. of concentrated hydrochloric acid and the solution is evaporated to dryness and further dried in vacuo over calcium chloride and potassium hydroxide; the desired compound is obtained in the form of small plate-like greenish-black crystals.

Example 4

To prepare 3-chloro 4-hydroxy 2′,4′-diamino azo benzene hydrochloride, 9.2 g. of 3-chloro 4-hydroxy aniline hydrochloride (in the form of very small plate-like white crystals, made by boiling 3-chloro 4-hydroxy acetanilide with 18% hydrochloric acid) is dissolved in 120 cc. of water and 10 cc. of concentrated hydrochloric acid; diazotization is effected at 0° C. with 4.0 g. of sodium nitrite contained in 35 cc. of water; excess nitrous acid is destroyed with 1 g. of urea; a solution of 7.38 g. of m-phenylene diamine hydrochloride in 65 cc. of water is added at 0° C. and the solution is stirred for an hour at 0° C. and allowed to stand at 25° C. for fifteen hours; the solution is made ammoniacal; the precipitate, the base of the desired compound, is filtered off, washed with two liters of water, and dried in vacuo; conversion into the hydrochloride is effected by dissolving 13.0 g. of the base in 125 cc. of acetone containing 6 cc. of concentrated hydrochloric acid, evaporating to dryness, drying in vacuo over calcium chloride and potassium hydroxide; the desired compound is obtained in the form of small plate-like black crystals.

Example 5

To prepare 2-ethoxy 5-chloro 2′,4′-diamino azo benzene hydrochloride, 7.2 g. of 2-amino 4-chloro phenetole hydrochloride is dissolved in 80 cc. of water and 8 cc. of concentrated hydrochloric acid; diazotization is effected with 3.0 g. of sodium nitrite contained in 30 cc. of water; excess nitrous acid is destroyed with 1 g. of urea; a solution of 5.0 g. of m-phenylene diamine hydrochloride in 35 cc. of water is added at 0° C. and the solution is stirred for an hour at 0° C. and allowed to stand for fifteen hours at 25° C.; the solution is made ammoniacal with 40 cc. of concentrated ammonium hydroxide; the precipitate, the base of the desired compound, is filtered off, washed with 2 liters of water, and dried in vacuo; conversion into the hydrochloride is effected by dissolving 9.4 g. of the base in 150 cc. of acetone containing 4 cc. of concentrated hydrochloric acid, evaporating to dryness, and drying in vacuo over calcium chloride and potassium hydroxide; the desired compound is obtained in the form of small plate-like black crystals melting at 144–145° C. and decomposing at 185–186° C.

It is to be understood that the foregoing embodiments are merely illustrative and by no means limitative of the invention, which may assume various other forms—for instance, as to the specific halogens and alkyls in the compounds and the modes of manufacturing and employing the compounds—within the scope of the appended claims.

I claim:

1. Compounds having the general formula

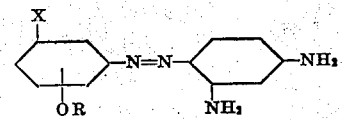

wherein X represents a halogen and R represents an alkyl or hydrogen.

2. Compounds having the general formula

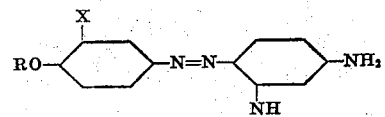

wherein X represents a halogen and R represents an alkyl or hydrogen.

3. Compounds having the general formula

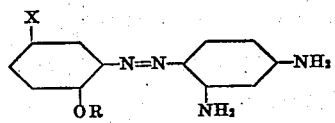

wherein X represents a halogen and R represents an alkyl or hydrogen.

4. 3-chloro 4-ethoxy 2′,4′-diamino azo benzene hydrochloride.

5. 3-chloro-4-hydroxy 2′,4′-diamino azo benzene hydrochloride.

6. 2-ethoxy 5-chloro 2′,4-diamino azo benzene hydrochloride.

7. In the preparation of compounds having the general formula

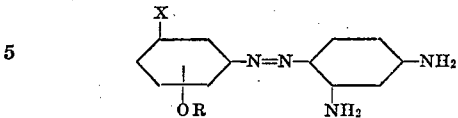

wherein X represents a halogen and R represents an alkyl or hydrogen, the steps of diazotizing

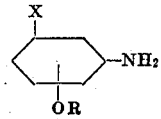

and coupling the reaction product with m-phenylene diamine.

8. Devitalizing bacteria by subjecting them to the action of compounds having the general formula

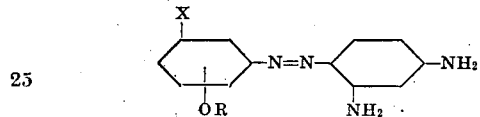

wherein X represents a halogen and R represents an alkyl or hydrogen.

9. Devitalizing bacteria by subjecting them to the action of compounds having the general formula

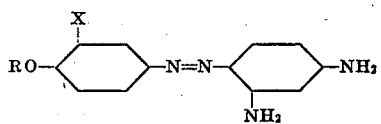

wherein X represents a halogen and R represents an alkyl or hydrogen.

10. Devitalizing bacteria by subjecting them to the action of compounds having the general formula

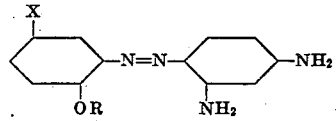

wherein X represents a halogen and R represents an alkyl or hydrogen.

11. Devitalizing bacteria by subjecting them to the action of 3-chloro 4-ethoxy 2',4'-diamino azo benzene hydrochloride.

12. Devitalizing bacteria by subjecting them to the action of 3-chloro 4-hydroxy 2',4'-diamino azo benzene hydrochloride.

13. Devitalizing bacteria by subjecting them to the action of 2-ethoxy 5-chloro 2',4'-diamino azo benzene hydrochloride.

WILLIAM S. JONES.